United States Patent
Patil et al.

(10) Patent No.: US 11,210,472 B2
(45) Date of Patent: Dec. 28, 2021

(54) AUTOMATED EXTRACTION OF MESSAGE SEQUENCE CHART FROM TEXTUAL DESCRIPTION

(71) Applicant: Tata Consultancy Services Limited, Mumbai (IN)

(72) Inventors: Sangameshwar Suryakant Patil, Pune (IN); Swapnil Vishweshwar Hingmire, Pune (IN); Nitin Vijaykumar Ramrakhiyani, Pune (IN); Sachin Sharad Pawar, Pune (IN); Harsimran Bedi, Pune (IN); Girish Keshav Palshikar, Pune (IN); Pushpak Bhattacharyya, Patna (IN); Vasudeva Varma Kalidindi, Hyderabad (IN)

(73) Assignee: Tata Consultancy Services Limited, Mumbai (IN)

(*) Notice: Subject to any disclaimer, the term of this patent is extended or adjusted under 35 U.S.C. 154(b) by 179 days.

(21) Appl. No.: 16/813,840

(22) Filed: Mar. 10, 2020

(65) Prior Publication Data
US 2020/0394365 A1 Dec. 17, 2020

(30) Foreign Application Priority Data
May 8, 2019 (IN) .............................. 201921018437

(51) Int. Cl.
*G06F 40/30* (2020.01)
*G06F 16/34* (2019.01)
(Continued)

(52) U.S. Cl.
CPC .......... *G06F 40/30* (2020.01); *G06F 16/3344* (2019.01); *G06F 16/345* (2019.01);
(Continued)

(58) Field of Classification Search
CPC ...... G06F 40/30; G06F 40/205; G06F 40/279; G06F 40/284; G06F 40/289; G06F 40/295
See application file for complete search history.

(56) References Cited

U.S. PATENT DOCUMENTS 7,493,253 B1* 2/2009 Ceusters ................. G06F 40/30
704/9
8,527,262 B2 9/2013 Kambhatla et al.
(Continued)

OTHER PUBLICATIONS

Bedi et al., "Event timeline generation from history textbooks." Proceedings of the 4th Workshop on Natural Language Processing Techniques for Educational Applications (NLPTEA 2017) (Year: 2017).*

(Continued)

*Primary Examiner* — Samuel G Neway
(74) *Attorney, Agent, or Firm* — Finnegan, Henderson, Farabow, Garrett & Dunner LLP

(57) ABSTRACT

Narrative texts contain rich knowledge about actors and interactions among them. It is often useful to extract and visualize these interactions through a set of inter-related timelines in which an actor has participated. Current approaches utilize labeled datasets and implement supervised techniques and thus are not suitable. Embodiments of the present disclosure implement systems and methods for automated extraction of Message Sequence Chart (MSC) from textual description by identifying verbs which indicate interactions and then use dependency parsing and Semantic Role Labelling based approaches to identify senders (initiating actors) and receivers (other actors involved) for these interaction verbs. The present disclosure further employs an optimization-based approach to temporally re-order these interactions.

20 Claims, 3 Drawing Sheets

(51) Int. Cl.
*G06F 40/284* (2020.01)
*G06F 40/211* (2020.01)
*G06F 40/253* (2020.01)
*G06F 16/33* (2019.01)
*G06F 40/205* (2020.01)
*G06F 40/289* (2020.01)
*G06F 40/279* (2020.01)
*G06F 40/295* (2020.01)

(52) U.S. Cl.
CPC .......... *G06F 40/205* (2020.01); *G06F 40/211* (2020.01); *G06F 40/253* (2020.01); *G06F 40/279* (2020.01); *G06F 40/284* (2020.01); *G06F 40/289* (2020.01); *G06F 40/295* (2020.01)

(56) References Cited

U.S. PATENT DOCUMENTS

| | | | | |
|---|---|---|---|---|
| 10,387,575 | B1* | 8/2019 | Shen | G06F 40/268 |
| 2008/0228467 | A1* | 9/2008 | Womack | G06F 40/30 |
| | | | | 704/9 |
| 2008/0319735 | A1* | 12/2008 | Kambhatla | G06F 40/30 |
| | | | | 704/9 |
| 2020/0394365 | A1* | 12/2020 | Patil | G06F 40/211 |

OTHER PUBLICATIONS

Patil et al., "Identification of alias links among participants in narratives." Proceedings of the 56th Annual Meeting of the Association for Computational Linguistics (vol. 2: Short Papers) (Year: 2018).*

Kof, Scenarios: "Identifying missing objects and actions by means of computational linguistics." 15th IEEE International Requirements Engineering Conference (RE 2007). IEEE (Year: 2007).*

Gildea, D. et al. (Sep. 2002). "Automatic Labeling of Semantic Roles," *Computational Linguistics*, vol. 28, No. 3; 60 pages.

Abend, O. et al. "Unsupervised Argument Identification for Semantic Role Labeling," *Proceedings of the Joint Conference of the 47th Annual Meeting of the ACL and the 4th International Joint Conference on Natural Language Processing of the AFNLP*, Suntec, Singapore, Aug. 2-7, 2009; pp. 28-36.

* cited by examiner

AUTOMATED EXTRACTION OF MESSAGE SEQUENCE CHART FROM TEXTUAL DESCRIPTION

PRIORITY CLAIM

This U.S. patent application claims priority under 35 U.S.C. § 119 to: India Application No. 201921018437, filed on May 8, 2019. The entire contents of the aforementioned application are incorporated herein by reference.

TECHNICAL FIELD

The disclosure herein generally relates to text processing techniques, and, more particularly, to automated extraction of message sequence chart from textual description.

BACKGROUND

Text such as narrative texts, particularly in history, contain rich knowledge about actors and interactions among them along with their temporal and spatial details. It is often useful to extract and visualize these interactions from such texts through a set of inter-related timelines, one for each actor, where the timeline of an actor specifies the temporal order of interactions in which that actor has participated. Message Sequence Chart (MSC) is an intuitive visual notation with rigorous mathematical semantics that can help to precisely represent and analyze such scenarios. Existing techniques convert software requirements to MSC. Event timeline construction is a related task about inferring the temporal ordering among events, but where events are not necessarily interactions among actors. Another related line of research is storyline or plot generation from narrative texts such as news stories or fiction which use different narratological output representations (not MSC), such as event sequences or story curves. Further, these existing techniques implement supervised approaches that use shallow Natural Language Processing (NLP) techniques and also require labeled datasets.

SUMMARY

Embodiments of the present disclosure present technological improvements as solutions to one or more of the above-mentioned technical problems recognized by the inventors in conventional systems. For example, in one aspect, there is provided a processor implemented method for automated extraction of message sequence chart from textual description. The processor implemented method comprises obtaining textual description indicative of a narrative text comprising a plurality of sentences; identifying a plurality of actors and aliases in the textual description and resolving corresponding coreferences associated thereof; traversing, using a breadth-first-search (BFS) technique, dependency parse tree of each sentence from the textual description to obtain past-tense words and a set of identified verbs in the obtained past-tense words; identifying at least a subset of interaction verbs from the set of identified verbs as at least one of a first type verb or a second type verb to obtain a set of interactions; identifying predicates and corresponding arguments in at least a subset of the plurality of sentences based on the set of interactions; identifying, using the identified predicates and corresponding arguments, senders and receivers from the plurality of actors and aliases, for each valid interaction from the set of interactions, wherein the senders and receivers are identified for the valid interactions comprised in at least a subset of sentences from the plurality of sentences; filtering the senders and receivers, using dependency parse based rules, to obtain a filtered set of senders and receivers; generating, using the filtered set of senders and receivers, (i) a message for each unique combination of sender and receiver for each interaction verb from the subset to obtain a set of messages, and (ii) a message label for each of the set of messages, wherein the message label is indicative of a scenario; and generating a temporal ordering of messages using the set of messages based on an availability of explicit and relative time expressions in each sentence of the set of messages, wherein the temporal ordering of messages forms a message sequence chart.

In an embodiment, the step of identifying at least a subset of interaction verbs as at least one of a first type verb or a second type verb to obtain a set of interactions comprises eliminating one or more verbs of the set of identified verbs based on one or more criteria. In one embodiment, the one or more criteria comprise verbs representing mental actions, copula verbs and verbs denoting states of objects and actors.

In an embodiment, an interaction verb in the obtained past-tense words is one of an action verb or a communication verb.

In an embodiment, the senders and receivers may be identified by applying a Semantic Role Labelling (SRL) and semantic and syntactic verbal lexical resource based techniques on the identified predicates and corresponding arguments. In an embodiment, the senders are initiator of an interaction. In an embodiment, the receivers are other actors involved in the interaction with corresponding senders (e.g., entities involved in interaction with senders).

In another aspect, a system for automated extraction of message sequence chart from textual description is provided. The system comprises: a memory storing instructions; one or more communication interfaces; and one or more hardware processors coupled to the memory via the one or more communication interfaces, wherein the one or more hardware processors are configured by the instructions to: obtain textual description indicative of a narrative text comprising a plurality of sentences; identify a plurality of actors and aliases in the textual description and resolving corresponding coreferences associated thereof; traverse, using a breadth-first-search (BFS) technique, dependency parse tree of each sentence from the textual description to obtain past-tense words and a set of identified verbs in the obtained past-tense words; identify at least a subset of interaction verbs from the set of identified verbs as at least one of a first type verb or a second type verb to obtain a set of interactions; identify predicates and corresponding arguments in at least a subset of the plurality of sentences based on the set of interactions; identify, using the identified predicates and corresponding arguments, senders and receivers from the plurality of actors and aliases, for each valid interaction from the set of interactions, wherein the senders and receivers are identified for the valid interactions comprised in at least a subset of sentences from the plurality of sentences; filter the senders and receivers, using dependency parse based rules, to obtain a filtered set of senders and receivers; generate, using the filtered set of senders and receivers, (i) a message for each unique combination of sender and receiver for each interaction verb from the subset to obtain a set of messages, and (ii) a message label for each of the set of messages, wherein the message label is indicative of a scenario; and generate a temporal ordering of messages using the set of messages based on an availability of explicit and relative time expressions in each sentence of the set of messages, wherein the temporal ordering of messages forms a message sequence chart.

In an embodiment, the step of identifying at least a subset of interaction verbs as at least one of a first type verb or a second type verb to obtain a set of interactions comprises eliminating one or more verbs of the set of identified verbs based on one or more criteria. In one embodiment, the one or more criteria comprise verbs representing mental actions, copula verbs and verbs denoting states of objects and actors.

In an embodiment, an interaction verb in the obtained past-tense words is one of an action verb or a communication verb.

In an embodiment, the senders and receivers may be identified by applying a Semantic Role Labelling (SRL) and semantic and syntactic verbal lexical resource based techniques on the identified predicates and corresponding arguments. In an embodiment, the senders are initiator of an interaction. In an embodiment, the receivers are other actors involved in the interaction with corresponding senders (e.g., entities involved in interaction with senders).

In yet another aspect, there are provided one or more non-transitory machine readable information storage mediums comprising one or more instructions which when executed by one or more hardware processors cause automated extraction of message sequence chart from textual description by obtaining textual description indicative of a narrative text comprising a plurality of sentences; identifying a plurality of actors and aliases in the textual description and resolving corresponding coreferences associated thereof; traversing, using a breadth-first-search (BFS) technique, dependency parse tree of each sentence from the textual description to obtain past-tense words and a set of identified verbs in the obtained past-tense words; identifying at least a subset of interaction verbs from the set of identified verbs as at least one of a first type verb or a second type verb to obtain a set of interactions; identifying predicates and corresponding arguments in at least a subset of the plurality of sentences based on the set of interactions; identifying, using the identified predicates and corresponding arguments, senders and receivers from the plurality of actors and aliases, for each valid interaction from the set of interactions, wherein the senders and receivers are identified for the valid interactions comprised in at least a subset of sentences from the plurality of sentences; filtering the senders and receivers, using dependency parse based rules, to obtain a filtered set of senders and receivers; generating, using the filtered set of senders and receivers, (i) a message for each unique combination of sender and receiver for each interaction verb from the subset to obtain a set of messages, and (ii) a message label for each of the set of messages, wherein the message label is indicative of a scenario; and generating a temporal ordering of messages using the set of messages based on an availability of explicit and relative time expressions in each sentence of the set of messages, wherein the temporal ordering of messages forms a message sequence chart.

In an embodiment, the step of identifying at least a subset of interaction verbs as at least one of a first type verb or a second type verb to obtain a set of interactions comprises eliminating one or more verbs of the set of identified verbs based on one or more criteria. In one embodiment, the one or more criteria comprise verbs representing mental actions, copula verbs and verbs denoting states of objects and actors.

In an embodiment, an interaction verb in the obtained past-tense words is one of an action verb or a communication verb.

In an embodiment, the senders and receivers may be identified by applying a Semantic Role Labelling (SRL) and semantic and syntactic verbal lexical resource based techniques on the identified predicates and corresponding arguments. In an embodiment, the senders are initiator of an interaction. In an embodiment, the receivers are other actors involved in the interaction with corresponding senders (e.g., entities involved in interaction with senders).

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
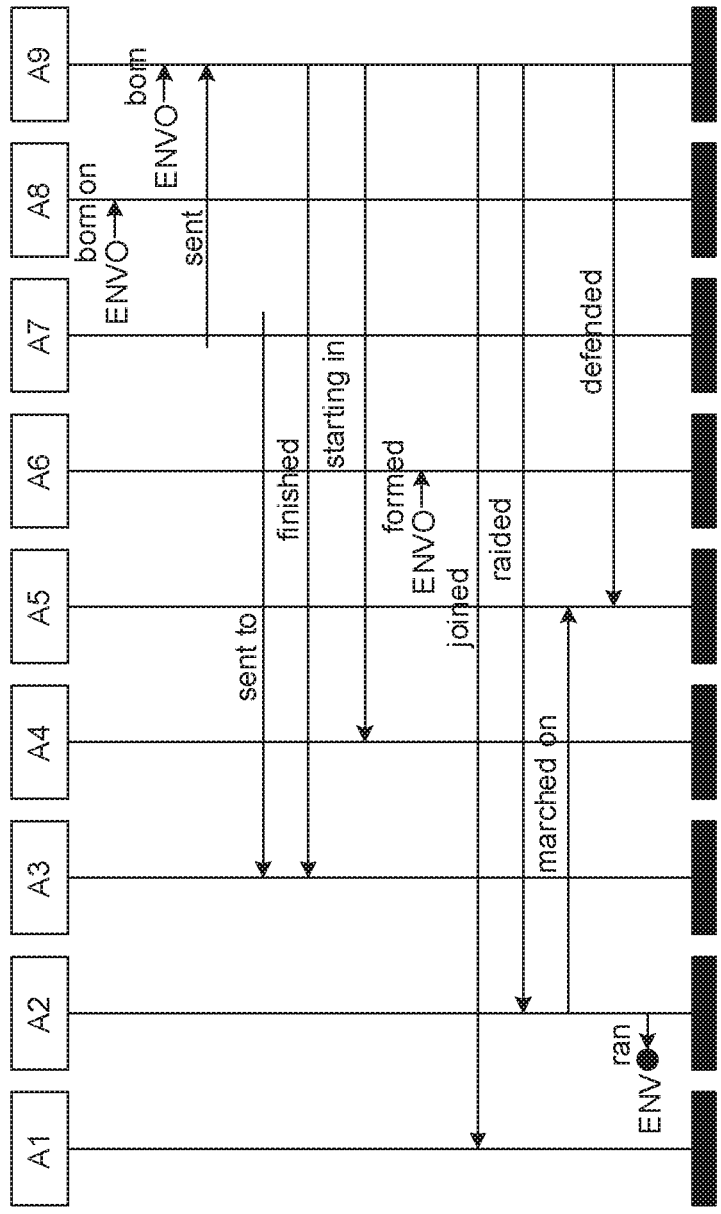
FIG. 1 illustrates a Message Sequence Chart (MSC) for an exemplary history text, in accordance with an example embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Though there has been some work in applying MSC for Software Engineering domain, less attention is given to the automatic construction of MSC using NLP. For example, in the conventional research, an "object-oriented" approach was proposed to automatically construct an MSC from a narrative. The approach makes use of a set of generative rules in the form of a grammar. Another approach was proposed to construct MSC for modelling scenarios from requirement analysis documents. This approach is based on situation stack based notion of human attention in a discourse. However, the approach makes naive assumption while finding senders, receivers and action verbs. For example, a sentence should contain only one action verb and it also assumes a pre-defined list of actors as candidates for sender/receivers. As history narratives include multiple senders/receivers/action verbs and the actors are not pre-specified in a sentence, the above convention approaches are not suitable.

Yet another conventional approach focuses on modelling of narrative schemas and their participants. This approach need a corpus of narratives to identify prototypical schemas which try to capture common sequence of events. On the contrary, present disclosure attempts to address a different technical problem of extracting MSC from a single narrative and does not need a corpus.

Open Information Extraction (OpenIE) systems as known in the conventional art aim to extract tuples consisting of relation phrases and their multiple associated argument phrases from an input sentence. The predicate-argument structures in OpenIE may seem similar to SRL and dependency parsing. However, in dependency parsing, relations are fixed, while SRL systems require deeper semantic analysis of a sentence and hence they depend on lexical resources like PropBank and FrameNet. On the other hand, the predicate-argument structures in OpenIE are not restricted to any pre-specified or fixed list of relations and arguments, also OpenIE does shallow semantic analysis of a sentence and hence it is less dependent on lexical resources.

Embodiments of the present disclosure provide systems and methods for automatic extraction of message sequence charts from textual description. More specifically, present disclosure implements systems and methods for extracting actors, and aliases and their interactions from a given input history narrative text, and maps them to actors and messages in the basic MSC notation. Moreover, the embodiments of the present disclosure implement an unsupervised approach enriched with linguistic knowledge.

The embodiments of the present disclosure generalize previous work along several dimensions, and implements an unsupervised approach enriched with linguistic knowledge. MSC extracted from the given history text can be analyzed for consistency, similarity, causality and used for applications such as question-answering. For example, from the example in Table 1 as depicted below, the MSC is extracted as shown in FIG. 1, which can be used to answer questions like "Whom did Napoleon defend the National Convention from?".

TABLE 1

1. Napoleon Bonaparte was born in 1769 on the island of Corsica.
2. When he was 9 years old, his parents sent him to a military school.
3. He finished school in 1785 before starting in the artillery department.
4. When the new government was formed, Napoleon joined its army.
5. When royalist rebels marched on the National Convention in October 1795, the young officer defended it.
6. The rebels then ran away in panic.
7. Three months earlier, Napoleon had raided the rebels.

More specifically, FIG. 1 illustrates a Message Sequence Chart for an exemplary history text, in accordance with an example embodiment of the present disclosure. The present disclosure utilizes MSC to represent knowledge about actors and their interactions in narrative history text. The approach of the present disclosure can represent interactions among actors in any narrative text (e.g., news, fiction and screenplays).

Input is a document D containing narrative text as mentioned above, and the desired output is an MSC depicting the interactions among the actors. No information about the actors or interactions is given as input as they need to be identified. For history narratives, an actor is defined as an entity of type Person, Organization (ORG) or Location (LOC), which actively participates in various interactions with other actors. The reason for including LOC entities as actors is that locations are important in history, and a timeline of events at a particular location provides an interesting perspective. Further, all coreferences of an actor are identified and a canonical (i.e., a standardized, normalized) mention is used for each; e.g., In Table 1, the actor mentions, Napoleon Bonaparte, Napoleon, he and the young officer refer to the actor Napoleon Bonaparte.

An interaction among actors is either (i) any deliberate (intentional) physical action, which is typically initiated by one or more actors and the remaining actors involved in it are affected by it in some way (e.g. attacked, joined), or (ii) communication, which results in passing of information or control among them (e.g., announced, talked).

The present disclosure focuses on interactions involving one or two actors. An interaction within itself involves only one actor; e.g., the attackers fled. When more than two actors are involved in an interaction (e.g., Napoleon's parents sent him to a military school.), the present disclosure breaks it into several pairwise interactions, if possible. On the other hand, if the sender or receiver in an interaction are missing or are implicit, a dummy actor environment (denoted by ENV) is used as the corresponding sender or receiver. For instance, in the sentence "The rebels ran away in panic", there is no explicit receiver. So, as shown in FIG. 1, the system of the present disclosure uses ENV as the receiver for the message, i.e., the message (The rebels; ran; ENV) is created.

Since the present disclosure represents an interaction as a message in an MSC, the direction of the interaction is important. The present disclosure assumes the direction to be from the initiator of the interaction to the actor affected by it. However, some interactions can be directionless; e.g., met, married. In such cases, the subject of the sentence is shown as sender of the message in MSC. Though notion of an interaction is similar to an event, a key difference between them is that there is explicit and intentional involvement of actors in an interaction; e.g., an earthquake is an event but it is not an interaction.

Temporal ordering of messages is the important and culminating step in the overall process of automated MSC extraction from narrative text. The present disclosure exploits explicit as well as implicit temporal clues available in the input narrative text to derive the temporal order among the messages in the MSC.

In the present disclosure, systems and methods and associated embodiments focus on interactions expressed using verbs because most of the action events in a language are expressed using verbs. Not all interactions in history narratives are important for creating an MSC. e.g., mental actions, such as felt cheated, came to know, assumed, considered, envisioned, are not considered as interactions. Copula verbs and verbs denoting a state of an object or actor do not trigger an interaction. The present disclosure implements unsupervised approaches using dependency parsing and Semantic Role Labelling for extracting interactions and corresponding senders/receivers, and further utilizes Integer Linear Programming to temporally order the interactions to create the MSC.

Figure 2:
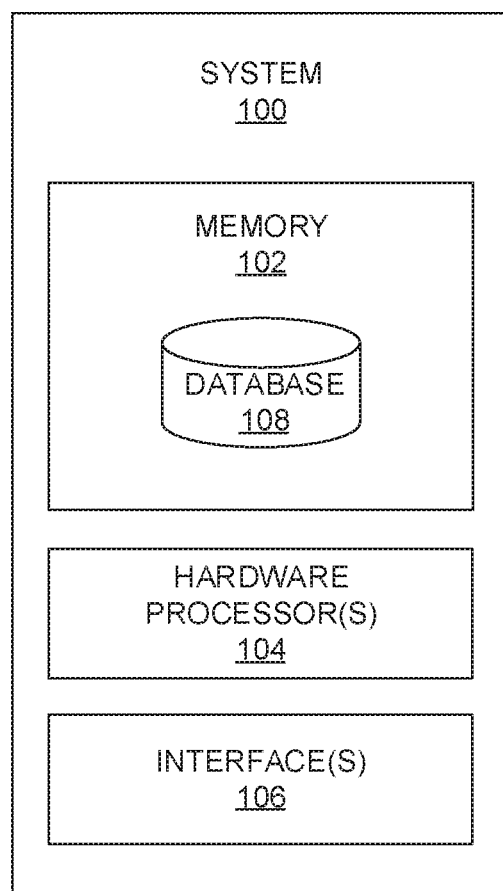
FIG. 2, with reference to FIG. 1, illustrates an exemplary block diagram of a system 100 for automated extraction of the MSC from textual description, in accordance with an embodiment of the present disclosure.
Figure 3:
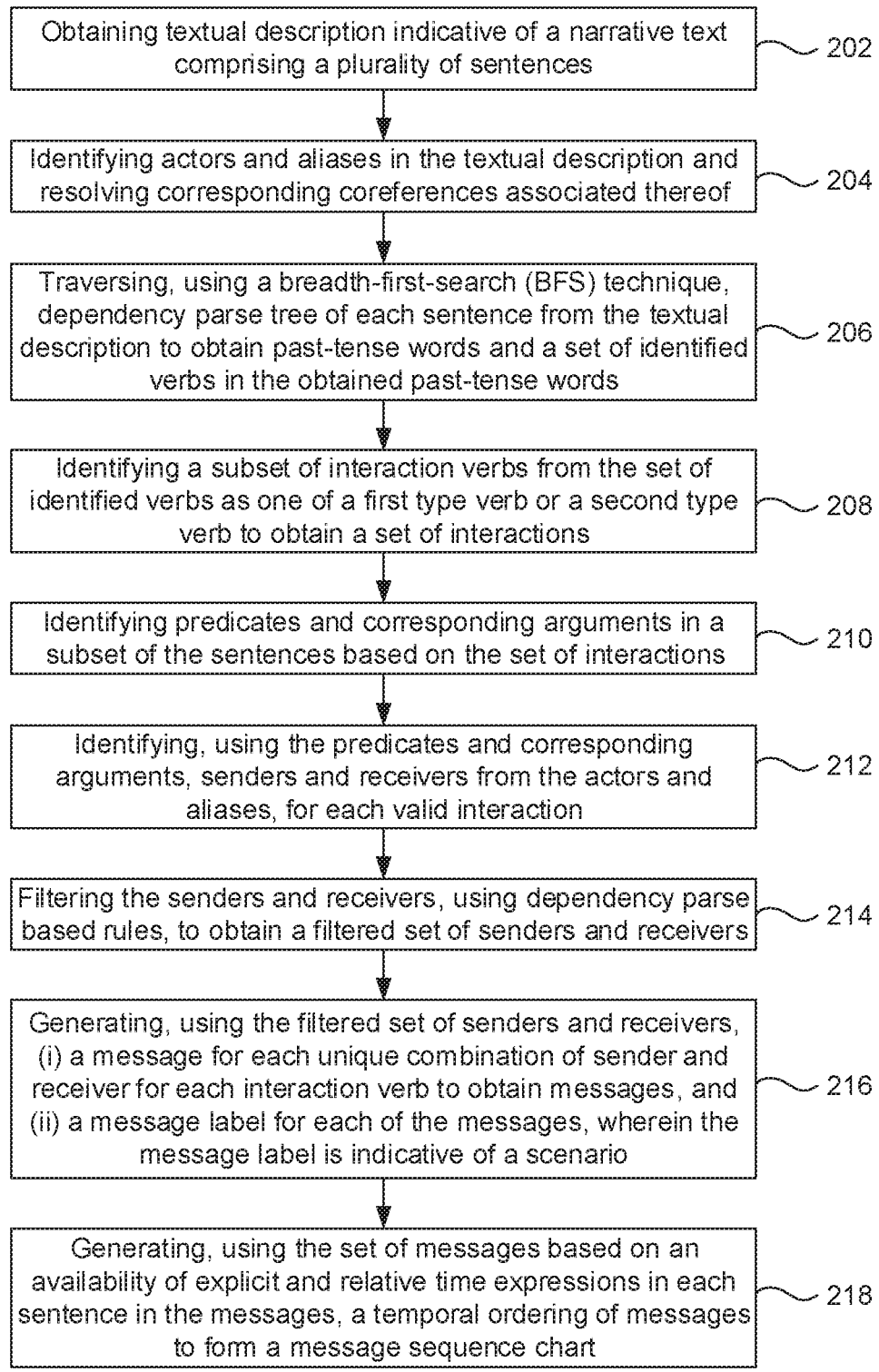
FIG. 3 is an exemplary flow diagram illustrating a method for automated extraction of the MSC from textual description using the system of FIG. 2, in accordance with an embodiment of the present disclosure.

Referring now to the drawings, and more particularly to FIGS. 1 through 3, where similar reference characters denote corresponding features consistently throughout the figures, there are shown preferred embodiments and these embodiments are described in the context of the following exemplary system and/or method.

FIG. 2, with reference to FIG. 1, illustrates an exemplary block diagram of a system 100 for automated extraction of message sequence chart from textual description, in accordance with an embodiment of the present disclosure. The system 100 may also be referred as 'MSC extraction system' and may be interchangeably used hereinafter. In an embodiment, the system 100 includes one or more hardware processors 104, communication interface device(s) or input/ output (I/O) interface(s) 106 (also referred as interface(s)), and one or more data storage devices or memory 102 operatively coupled to the one or more hardware processors 104. The one or more processors 104 may be one or more software processing modules and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the device 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or nonvolatile memory, such as read only memory (ROM), erasable programmable ROM, flash memories, hard disks, optical disks, and magnetic tapes. In an embodiment a database 108 can be stored in the memory 102, wherein the database 108 may comprise information, for example, narrative text, textual description comprising conversation/interaction between multiple users/stakeholders, and the like. In an embodiment, the memory 102 may store (or stores) one or more techniques(s) (e.g., Semantic Role Labeling, semantic and syntactic lexical resource (e.g., VerbNet, VerbOcean, etc.) and the like. The above techniques which when executed by the one or more hardware processors 104 perform the methodology described herein. The memory 102 further comprises (or may further comprise) information pertaining to input(s)/output(s) of each step performed by the systems and methods of the present disclosure. More specifically, information pertaining to identification of actors, aliases, coreferences resolution, verb identification, interaction verb identification, predicates and arguments identification, valid interactions, list of senders and receivers for sentences in input textual description, generated labels, MSCs for corresponding interaction verbs and valid interactions, and the like using unsupervised framework(s), and the like may be stored in the memory 102. In other words, input(s) fed at each step and output(s) generated at each step are comprised in the memory 102, and can be utilized in further processing and analysis. The memory 102 may further comprise dependency parse based rule(s) for filtering senders and receivers, in one example embodiment.

FIG. 3, with reference to FIGS. 1-2, is an exemplary flow diagram illustrating a method for automated extraction of message sequence chart from textual description using the system 100 of FIG. 2, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 2, exemplary narrative text of FIG. 1 and the flow diagram as depicted in FIG. 2. In an embodiment of the present disclosure, at step 202, the one or more hardware processors 104 obtain textual description indicative of a narrative text comprising a plurality of sentences. Below is an exemplary textual description.

1. Napoleon Bonaparte was born in 1769 on the island of Corsica.
2. When he was 9 years old, his parents sent him to a military school.
3. He finished school in 1785 before starting in the artillery department.
4. When the new government was formed, Napoleon joined its army.
5. When royalist rebels marched on the National Convention in October 1795, the young officer defended it.
6. The rebels then ran away in panic.
7. Three months earlier, Napoleon had raided the rebels.

At step 204, the one or more hardware processors 104 identify a plurality of actors and alias(es) (e.g., canonical mention(s)) in the textual description and resolve corresponding coreferences. In other words, text is passed through the system 100 and all the actors including aliases who are involved in one or more interactions are identified. All co-referring mentions of an actor are grouped into a set, and one canonical mention is chosen as a representative on the MSC. One complication can occur due to complex actors, which is an actor that contains multiple actors, one of which is independent and the others are dependent and serve to elaborate on the independent actor; e.g., his parents, military school, the army of the new government. For such scenarios, a complex actor is identified as a whole, and not its constituent actors separately. In an embodiment, the system 100 and its method utilizes Markov Logic Networks that encodes linguistic knowledge to identify the actors, and aliases and resolves their coreferences.

At step 206, the one or more hardware processors 106 traverse, using a breadth-first-search (BFS) technique, dependency parse tree of each sentence from the textual description to obtain past-tense words and a set of identified verbs in the obtained past-tense words. Since the focus is on interactions that have already occurred, only verbs in the past tense are of importance. In some cases, a valid interaction may be expressed through a verb not in the past tense. Such verbs are also considered as having the past tense. For example, in the sentence "Growing up in rural Hunan, Mao described his father as a stern disciplinarian, the verb "Growing" should be considered to be in the past tense. To consider all verbs in a sentence to be in the past tense, the past tense is propagated to other non-past tense verbs using linguistic rules. To detect verbs in past tense, the dependency parse tree of the input sentence is traversed in breadth-first-search (BFS) manner. A verb having a POS tag of VBD (past tense) is definitely in the past tense. A verb with the POS tag VBG (gerund) or VBN (past participle) is considered to be in past tense if:

(i) it is a child of another verb tagged with VBD or
(ii) it is the parent of an auxiliary verb tagged with VBD.
(iii) An infinitive verb is deemed to be in past tense if it has a governor in the dependency tree with dependency relation either "advcl:to" (adverbial clause connected through "to") or "xcomp" (open clausal compliment) and the governor is tagged with the POS tag VBD.

For the example sentence above "described" is tagged with VBD and hence it is in past tense; "Growing" is tagged with VBG and is child of "described" in the dependency parse tree; hence, "Growing" is also considered to be in the past tense.

In an embodiment of the present disclosure, at step 208, the one or more hardware processors 104 identifying at least a subset of interaction verbs from the set of identified verbs as at least one of a first type verb or a second type verb to obtain a set of interactions. In one embodiment, the first type verb and the second type verb comprise an action verb or a communication verb respectively.

Typically, the input text mentions many different interactions, and identifying each interaction is required. The scope of the system 100 allows consideration of interactions represented by verbs only. However, certain verbs need to be omitted such as verbs representing mental actions, copula verbs and verbs denoting states of objects and actors. In other words, the step of identifying at least a subset of interaction verbs as at least one of a first type verb or a second type verb to obtain a set of interactions comprises eliminating one or more verbs of the set of identified verbs based on one or more criteria. The one or more criteria comprise verbs representing mental actions, copula verbs and verbs denoting states of objects and actors as mentioned above.

The following pseudo code classifies each verb in the given sentence as an "action verb" or a "communication verb" (and ignores other types of verbs) using WordNet hypernyms of the verb itself or its nominal forms. Every identified action and communication verb is considered as an interaction.

Pseudo Code for Classifying Verbs: Classify_Verb:
1. Define sets VH_comm, VH_act, NH_comm, NH_act as follows:
   VH_comm={express, verbalize, utter, ask, convey, communicate, recognize}
   VH_act={control, give, transfer, move, act, create, destroy, make, change, go, travel, open, acquire, lose, connect}
   NH_comm={speech, communication, communicate, convey, message}
   NH_act={event, act, action, activity}
2. Define k as the maximum number of top WordNet senses to consider
3. For each sentence s, the set of all past tense verbs V is obtained in the sentence.
4. Following checks are applied for each verb v in V.
   a. If the WordNet hypernym tree of v contains senses in VH_comm then v is identified as a communication verb
   b. If the WordNet hypernym tree of v contains senses in VH_act then v is identified as an action verb
   c. c. If v is not identified as an action or communication verb then we obtain the verb's nominal form v' using the WordNet.
   d. If the WordNet hypernym tree of v' contains senses in NH_comm then v is identified as a communication verb
   e. If the WordNet hypernym tree of v' contains senses in NH_act then v is identified as an action verb
   f. v is ignored if it fails all above checks.

As an example consider the verb "defended". One of its nominal forms, "defence", has the category "act" in its WordNet hypernym tree; so it is classified as an action verb by the classification pseudo code.

In an embodiment of the present disclosure, at step 210, the one or more hardware processors 104 identify predicates and corresponding arguments in at least a subset of the plurality of sentences based on the set of interactions. In an embodiment of the present disclosure, at step 212, the one or more hardware processors 104 identify, using the identified predicates and corresponding arguments, senders and receivers from the plurality of actors, for each valid interaction from the set of interactions, wherein the senders and receivers are identified for the valid interactions comprised in at least a subset of sentences from the plurality of sentences. In an embodiment, the senders and receivers are identified by applying a Semantic Role Labelling (SRL) and semantic and syntactic verbal lexical resource based techniques on the identified predicates and corresponding arguments. In an embodiment, the semantic and syntactic verbal lexical resource based techniques comprise a VerbNet based technique only, VerbOcean based technique only, combinations thereof, and the like.

The above steps 210 till 212 are better understood by way of following description and by way of examples illustrated below:

Each identified interaction has to be mapped to one or more messages in the output MSC. It is also required to identify the sender (initiator of the interaction) and receiver (other actors involved in the interaction) for each message. A set of senders (SX) and a set of receivers (RX) are identified for each valid interaction. If both SX and RX of an interaction are empty, then it is ignored. If only one of them is empty, a special actor Environment (ENV) is added to the empty set. Once such sets are identified, a message is created for each unique combination of a sender and a receiver for a particular interaction verb.

To find the senders and receivers for each interaction, an approach based on Semantic Role Labelling (SRL) and VerbNet is implemented by the systems and methods of the present disclosure. SRL is an NLP approach for finding arguments of a verbal or nominal predicate occurring in a sentence. Each argument carries out a specific semantic role associated with the predicate. For example, the predicate 'give' has an 'agent' argument (A0: the doer of the give), a 'theme' (A1: the thing being given) and a 'recipient' (A2: the receiver of the give). SRL identifies the entities in a sentence which are arguments of the predicate occurring in the sentence. For example, in the sentence 'John gave Mary a book.', 'John' is the A0 argument, 'a book' is the A1 argument and 'Mary' is the A2 argument, for the predicate 'gave'.

On the other hand, VerbNet is the largest verb lexicon available for English. It is a verb lexicon with mappings to other lexical resources such as WordNet and FrameNet. VerbNet incorporates both semantic and syntactic information about verbs like thematic roles, selectional preferences and PropBank verb types. The approach for identification of senders and receivers based on SRL and VerbNet is explained in the pseudo code below:

Pseudo code: find_senders_receivers
1. Define sets B0, B1, B2, B3, B4 and B5 as follows:
   B0={agent, theme, cause},
   B1={experiencer},
   B2={AMLOC, AMDIR},
   B3={asset, cause, extent, instrument, stimulus, time, topic, theme, predicate},
   B4={theme},
   B5={agent, theme}
2. SRL is run for each sentence to identify the predicates and their corresponding arguments.
3. For each identified predicate, if it is an interaction (action or communication), the following check is performed to ascertain its senders and receivers:

a. If the predicate has an A0 argument and the VerbNet role of this predicate's A0 argument is found in the set B0 then the A0 argument is added to the set of senders SX of the interaction.
b. If the predicate has an A0 argument and the predicate is a communication verb and the VerbNet role of this predicate's A0 argument is found in the set B1 then the A0 argument is added to the set of senders SX of the interaction.
c. If the predicate is an ergative verb and has an A1 argument and the VerbNet role of this predicate's A1 argument is found in the set B5 then the A1 argument is added to the set of senders SX of the interaction.
d. For each argument Ai, other than A0 the following checks are performed:
e. If the type of Ai is in the set B2 then argument Ai is added to the set of receivers RX of the interaction.
f. If the VerbNet role of this predicate's Ai argument is not found in the set B3 then argument Ai is added to the set of receivers RX of the interaction.
g. If the predicate is an action verb and the VerbNet role of this predicate's Ai argument is found in the set B4 then the Ai argument is added to the set of receivers RX of the interaction.
h. If the Ai argument is a verb then this algorithm is called recursively for the verbal argument and its receivers are added to the set of receivers RX of the main predicate.

In an embodiment of the present disclosure, at step 214, the one or more hardware processors 104 filter the senders and receivers, using dependency parse based rules, to obtain a filtered set of senders and receivers.

To obtain filtered set of senders and receivers of the valid interactions, following dependency parse based rules (comprised in the memory 102) are applied, by way of illustrated examples:

1. If for a predicate there is an A0 argument which is connected with the predicate through a "nsubjpass" (passive subject) dependency relationship, then consider the A0 argument as a receiver.
2. If for a predicate an A0 argument doesn't exist, but there is a noun phrase which is its direct or indirect subject, then the noun phrase is added to the set of senders SX of the predicate.

In an embodiment of the present disclosure, at step 216, the one or more hardware processors 104 generate, using the filtered set of senders and receivers, (i) a message for each unique combination of sender and receiver for each interaction verb from the subset to obtain a set of messages; and (ii) generating a message label for each of the set of messages, wherein the message label is indicative of a scenario.

For message creation, each identified interaction requires mapping to one or more messages in the output MSC. Sender (initiator of the interaction) and receiver (other actors involved in the interaction or entities/actors that are involved in interaction with senders) are also required to be identified for each message. The present disclosure and its systems and methods have applied several techniques a set of senders (SX) and a set of receivers (RX) for each valid interaction verb (e.g., filtered set of senders and receivers for each valid interaction verb). If SX and RX are both empty, that particular interaction may be disregarded. If only one of them is empty, a special actor Environment (ENV) may be applied to that set. Once such sets are identified, a message is created for each unique combination of a sender and a receiver for a particular interaction verb.

Below description illustrates various approaches as implemented by the present disclosure:

Dependency parsing-based Approaches: Two approaches were implemented for message creation based on dependency parsing output: i) Baseline B1 which directly maps the dependencies output to messages and ii) Approach M1 (Algorithm 1—(Pseudo code 1)) which builds on the dependencies output by applying additional linguistic knowledge. Stanford CoreNLP as known in the art was utilized for dependency parsing by the present disclosure. It is to be understood to a person having ordinary skill in the art that any dependency parsing tool can be utilized.

Baseline B1 simply maps each interaction verb in the dependency tree to a set of messages. Actors directly connected to an interaction verb with certain dependency relations (nsubj, nmod:agent) are identified as senders whereas actors directly connected to the verb with certain other dependency relations (dobj, nsubjpass, xcomp, iobj, advcl: to, nmod:*) are identified as receivers.

Approach M1 improves upon this baseline by generalizing connections between the verb and potential senders and receivers. Rather than considering only direct connections in dependency tree, M1 identifies certain actors as senders which are connected to the verb with a set of allowable dependency paths such as nmod:poss→nsubj or nsubj→advcl (lines 3-9 in Algorithm 1). For example, consider the sentence Bravery of Rajputs pushed the Mughals back. Here, Rajputs is not directly connected to pushed in the dependency tree. Still, M1 would be able to identify Rajputs as sender because its dependency path to the verb pushed is nmod:of→nsubj. Similarly, M1 identifies certain actors as receivers which are descendants of the verb in the dependency tree and the dependency paths connecting them to the verb satisfy certain properties such as "no other verb is allowed on the path" (lines 10-13 in Algorithm 1). Presence of another intermediate verb on such dependency path is a strong indicator that the receiver is an argument for the intermediate verb. For example, in the sentence Crossing the Alps, Napoleon attacked Italy, the Alps is not a valid receiver for the verb attacked because another verb Crossing occurs on the dependency path connecting the Alps to attacked.

SRL-based Approaches: Two approaches were implemented by the present disclosure for message creation based on SRL output: i) Baseline B2 which directly maps the SRL output to messages and ii) Approach M2 (Algorithm 2) which builds on the SRL output by applying additional linguistic knowledge. The present disclosure implements the system 100 that is built on output of any SRL tool (e.g., MatePlus as known in the art technique) for SRL which produces predicate-argument structures as per PropBank as known in the art technique. The baseline B2 simply maps each verbal predicate corresponding an interaction verb (action or communication) to a set of messages. Actors corresponding to A0 arguments of a verbal predicate are identified as senders whereas actors corresponding to other arguments are identified as receivers.

Approach M2 improves upon this baseline by using VerbNet (technique as known in the art) roles (the function vnrole) associated with PropBank arguments. Certain selectional preferences are used on these VerbNet roles, so as to qualify them as valid senders or receivers. These preferences are based on the linguistic knowledge and the details are described in the Algorithm 2 (Pseudo code 2). For example, consider the sentence Peter described John as very polite. Here, for the communication verb describe, vnrole (describe.01.A1)=theme. As per our linguistic rule, even if any actor is part of theme of a communication verb, that actor does not qualify to be a receiver, as it is not directly participating in the interaction. Line 18 in Pseudo code 2 encodes this rule, thereby not allowing any actor which part of a theme to be a receiver. Hence, in this example sentence, John will not be a receiver for describe.

Pseudo code 2 also handles a special case about Ergative verbs which lie in between the spectrum of transitive and intransitive verbs. Their most distinguishing property is that when an ergative verb does not have a direct grammatical object, its grammatical subject plays an object-like role. For example, consider following two sentences containing an ergative verb move:

S1: Mao's father moved him to a hostel.
S2: Mao moved to Beijing.

In S1, moved has an object but in S2, it does not have any direct object. Semantic Role Labelling assigns the role A1 (thing moving) to Mao in S2 and hence it cannot be a sender. But as S2 indicates that the actor (Mao) is willingly performing the action of moving, it is expected by the system 100 that Mao is a sender. Hence, for an ergative verb, even if the SRL assigns A1 role to an actor, such an actor is considered for being sender if no A0 role is assigned for the ergative verb by the SRL (lines 9-13 in Algorithm 2).

Below are exemplary Pseudo codes for Algorithm 1 and 2 as comprised in the system 100 and implemented thereof:

---

Pseudo Code 1 for Algorithm 1: create_message_M1:

--- input: s (sentence), A (set of known actors with coreferents), v (interaction verb),
  DPOSS = {nmod:poss,nmod: of},
  DS = {nsubj,nmod: agent},
  DR = {dobj,iobj,nmod *,xcomp,nsubjpass,advcl: to},
output: SX=set of senders, RX=set of receivers
1. SX, RX := ∅
2. $E_d$ := GetDependencyTree(s)
   //$E_d$ is set of tuples of the form (a,b, dr) where a is governor of b with dependency relation dr//
3. foreach actor a ∈ A s.t. a has mention in s do
4.   if (v,a,ds) ∈ $E_d$ ∧ ds ∈ DS then
       SX := SX ∪ {a}; continue
5.   if (v,a,nmod:* with) ∈ $E_d$ then
       SX := SX ∪ {a}; continue
6.   if ∃u s.t. (u,v,advcl *) ∈ $E_d$ ∧ (v,a,ds) ∈ $E_d$ ∧ ds ∈ DS then
7.     SX := SX ∪ {a}; continue
8.   if ∃u s.t (v,u,ds) ∈ $E_d$ ∧ ds ∈ DS ∧ u.p = OTH ∧ (u,a,dp) ∈ $E_d$ ∈ DPOSS
       then SX := SX ∪ {a}; continue
9.   if ∃b s.t b ∈ SX ∧ (b,a,nmod:* with) ∈ $E_d$
       then SX := SX ∪ {a}; continue
10. foreach actor b ∈ A\SX in s s.t.∃ path P from v to b in G using $E_d$ do
11. if ∃u ≠ v s.t u. POS = VB *∧u ∈ P ∧(v,u,dr) ∈ $E_d$ ∧ dr ∉ DI then continue
12. if ∃u ≠ v s.t u. POS = VB *∧u ∈ P ∧ (v,u,*) ∉ $E_d$ then continue
13. if ∃x in P s.t.(x,b, dr) ∈ $E_d$ ∧ dr ∈ DR then
      RX := RX ∪ {b}
14. return (SX, RX)

---

Pseudo Code 2 for Algorithm 2: create_message_M2:

--- input: s (sentence), A (set of known actors with coreferents), v(interaction verb)
  $B_0$ = {agent,theme,cause},
  $B_1$ = {experiencer},
  $B_2$ = {AMLOC,AMDIR},
  $B_3$ = {asset,cause,extent,instrument,stimulus,time, topic,theme,predicate},
  $B_4$ = {theme},
  $B_5$ = {agent,theme}
output: SX = set of senders, RX = set of receivers,
1. H := MatePlus(S); // output of MatePlus
2. SX, RX := ∅;
3. if v ∉ H ∨ is_copula_like(v) then return (SX, RX)
4. if H.v has argument $A_0$ then
5.   x := H.v.$A_0$.phrase;
6.   if x contains an actor from A then
7.     if vnrole (H.v.$A_0$) ∈ $B_0$ ∨ ($is_{comm(H.v)}$ ∧ vnrole (H.v.$A_0$) ∈ $B_1$ then
8.       SX := SX ∪ {get_actor(x,A)};
9. else if is_ergative(v) ∧ H.v has argument $A_1$ then
10.  x := H.v.$A_1$. phrase; if x contains an actor from A then
11.    if vnrole(H.v.$A_1$) ∈ $B_5$ then
12.      SX := SX ∪ {get_actor(x,A)};
13. foreach argument $A_i$ (i > 0)in H.v do
14.   x := H.v.$A_i$.phrase; if x contains an actor from A\SX then continue
15.

-continued

Pseudo Code 2 for Algorithm 2: create_message_M2:

16.  if H.v.A$_i$ ∈ B$_2$ ⋁ vnrole(H.v.A$_j$) ∉ B$_3$ ⋁ (is$_{action(H.v)}$ ∧ H.v.A$_i$ ∈ B$_4$) then
17.      RX := RX ∪ {get_actor(x,A)};
18.  if H.v has another predicate v' as argument then
19.  SX', RX' := create_message_M2(S,A,v'); RX := RX ∪ RX';
20.  return(SX, RX)

Combined SRL and Dependency parsing based Approach (M3): SRL tools are useful to identify senders and receivers of a message, but they do have a few important limitations. For example, (i) SRL tool may fail to identify any A0 even when it is present or when it thinks the verb does not require A0 in the sentence; (ii) the identified A0 may be wrong or cannot be considered as sender; (iii) SRL tool may fail to identify any A1/A2 even when it is present; (iv) the identified A1/A2 may be wrong or cannot be considered as receiver.

The present disclosure calls this combined approach as M3 which corrects the output of SRL-based approach M2 by using the output of dependencies based approach B1. Here, the intuition is that B1 uses only high-precision rules for identifying senders and receivers. Hence, B1's output can be used to correct a few errors introduced in the M2's output. For example, in He was accorded a very cordial reception and was loaded with gifts. MatePlus (in M2) identifies He as A0 for accorded, which is wrong (or also referred as incurred) because He is not the initiator of this interaction; He should be A1 for accord. This is corrected by the system 100 by using the fact that B1 (dependencies based approach) detects the nsubjpass dependency between accorded and He and identifies He as receiver. As another example, for His father united him in an arranged marriage to Luo Yigu, thereby uniting their land-owning families. MatePlus does not identify any A0 for uniting, where the true A0 is His father, which is corrected by the system 100 using the dependency parse in which His father is connected to uniting through the path nsubj→advcl.

The present disclosure implements a simplistic approach for generating a clear and intuitive label for each message, covering various scenarios. For instance, for a verbal event, the label includes the main verb (joined) followed by a particle (if present) set_up, a preposition (if present) cut_off_from, a negation (if present) not_cut_off_from and an optional secondary verb (infinitive, gerund or past participle). The secondary verb may also may be followed by a particle and/or preposition (set_up_to_defend, helped_organize, set_up_for_taking_away_from). The general syntax of our message label is given by the regular expression: NEG? PAST_VERB PARTICLE? (PREP/to)? (NEG? SECONDARY_VERB PARTICLE? PREP?)?

The system 100 does not include adverbs, nor any nominal objects and arguments as part of the message label. Further the system 100 does not include any auxiliary or modal verbs; e.g., from had fled, was elected rather gets the message labels fled, elected. Syntactic verbal structures such as could have helped indicate interactions that may not have taken place; so no messages are created for them. In other words, neither adverbs nor any nominal objects and arguments are considered as part of the message label, in one example embodiment. Auxiliary or modal verbs are also ignored as part of the message label, in another example embodiment. Syntactic verbal structures that indicate interactions that may not have taken place are ignored, in yet another example embodiment.

In an embodiment of the present disclosure, at step 218, the one or more hardware processors 104 generate a temporal ordering of messages using on the set of messages based on an availability of explicit and relative time expressions in each sentence of the set of messages, wherein the temporal ordering of messages forms a message sequence chart.

Explicit as well as implicit temporal expressions (timex) available in the text are used for ordering interactions and creating the timeline of each actor in the MSC. The focus is restricted to consider only the BEFORE temporal relation between two interactions, in one example embodiment of the present disclosure.

Temporal ordering of messages in a MSC is the final step and an important sub-problem of the overall high-level objective of automated MSC extraction. As mentioned above, the system 100 uses the explicit as well as implicit temporal expressions (timex) available in the text and derive an ordering of messages on the timeline of each actor in the MSC.

Firstly, explicit and relative time expressions (timex) are identified in each sentence. Explicit timex are date points which are self-contained (e.g., October 1795) or can be resolved based on previously occurring dates (e.g., Three months earlier). Explicit timex are identified and normalized using the Heideltime timex recognizer and normalization system as known in the art. Relative timex are lexical markers (e.g., after, before) which are useful to order two or more interactions in a sentence. In other words, in case of sentences with multiple message verbs, the normalized explicit timex is assigned as the temporal anchor of the message which has its main verb nearest to the timex in the sentence's dependency tree. As all messages in a narrative need not have a corresponding timex, the order of such messages as they appear in input narrative text needs to be preserved.

However, it is important to note that messages may be in sentences without any explicit timex. In order to find the temporal anchor of such messages, the system 100 employs the "document level time-anchoring (DLT)" algorithm as known in the art. The algorithm takes a list of messages (as per the text order) and document creation time (DCT) as inputs. The key assumption behind the algorithm is that all the messages of exactly same tense tend to occur in the text order, unless stated explicitly. In other words, an explicit timex for the current message with tense t is mentioned by a user, only if its temporal anchor is different from the anchor of the last message of tense t.

The algorithm proceeds as follows: If a message m has a time anchor t obtained from an explicit timex, then t is stored in a tense-to-anchor map as the last seen anchor associated with the tense of m. However, if m does not have a temporal anchor assigned, then the last seen anchor of the message's tense is obtained from the tenseto-anchor map and set as m's temporal anchor. If the tense-to-anchor map does not have a mapping for m's tense then the provided DCT is set as m's temporal anchor.

Once all messages are assigned some temporal anchor, a simple sorting algorithm (as known in the art) is used to order the messages based on their anchors. While sorting it is taken care that the assumption of ordering messages with the same temporal anchor by their text order is maintained.

To achieve the goal of constructing a time-line for each actor, an Integer Linear Programming formulation (ILP) is devised. The explicit and relative timex derived earlier are used as the constraints in the ILP. Objective of the ILP optimization is to minimize the deviation of messages, which do not have any temporal clues, from their default narrative order.

ILP Variables:
N: Number of messages
T: Input parameter, matrix of size N×N such that $T_{ij}=1$ indicates that $i^{th}$ message appears before $j^{th}$ message as per text order.
C×R: Input parameter, matrix of size N×N such that $C×R_{ij}=1$ indicates that $i^{th}$ message appears before $j^{th}$ message as per relative temporal order clues.
C×E: Input parameter, matrix of size N×N such that $C×E_{ij}=1$ indicates that $i^{th}$ message appears before $j^{th}$ message as per explicit temporal information.
NoE: Input parameter, binary vector of size N such that $NoE_i=1$ if $i^{th}$ message does not have explicit temporal expression associated with it.
x: Output variable, matrix of size N×N such that $x_{ij}=1$ if $i^{th}$ message happens before $j^{th}$ message.

ILP Objective: Minimize the deviation of message, which do not have any temporal clues, from their default narrative order.

$$\sum_{i,j: i \ne j; NoE[i]+NoE[j] \ge 1} T[i,j] * T[i,j] - x[i,j]$$

Subject to following constraints:
C0: Irreflexivity: $\Sigma_{i=1}^{N} x_{ii}=0, \forall i$
C1: Anti-symmetry: $x_{ij}+x_{ji} \le 1, \forall i,j$ s.t.$i \ne j$
C2: Transitivity: $x_{ij}+x_{jk}-1 \le x_{ik}, \forall i,j,k$ s.t.$i \ne j$ and $j \ne k$
C3: Observed temporal order should be complied with both relative and explicit temporal clues: $C×R_{ij}\cdot(C×R_{ij}-x_{ij})=0, \forall i,j$ and $C×E_{ij}\cdot(C×E_{ij}-x_{ij})=0, \forall i,j$ Experimental Evaluation:

Datasets:

The approach of the present disclosure and its systems and methods was evaluated on history narratives as they are replete multiple actors, spatio-temporal details and have challenging cases of interactions. Public narratives of varying linguistic complexity was chosen to cover a spectrum of history: (i) famous personalities: Napoleon (Nap) (Littel, 2008), and Mao Zedong (Mao) (Wikipedia, 2018), (ii) a key event: Battle of Haldighati (BoH) (Chandra, 2007), and (iii) a major phenomenon: Fascism (Fas) (Littel, 2008).

The present disclosure and its systems and methods also used a subset of the Facebook®'s bAbI QA dataset (Weston et al., 2015) which is a text understanding and reasoning benchmark. bAbI dataset of the present disclosure included 10 instances from the time-reasoning subset of the bAbI QA dataset. Each instance consisted of two interleaved sets of information: a set of sentences describing an event and its time for example, Mary went to the cinema yesterday. and a set of temporal reasoning questions which need to be answered based on the sentences seen till that instant. Questions from each instance were removed keeping only the event description sentences as input to the approach.

These datasets were annotated (e.g., manually annotated) for independent actor mentions, their aliases (canonical mentions), interaction verbs and complete messages. Number of sentences and messages for the datasets are: Nap (106, 99), Fas (117, 115), BoH (77, 133), Mao (58, 135) and bAbI (118, 118).

Evaluation:

Highest priority was given to message label and hence senders/receivers of a message are deemed to be correct only if the corresponding message label has been identified correctly. F-measure were first computed for identifying only the message labels, ignoring the corresponding senders/receivers.

Message identification performance of the proposed approaches were first evaluated at two levels: i) complete messages with actor mentions (denoted as L1 level) and ii) complete messages with canonical mentions of the actors (L2 level). As described above, each actor mention has a canonical mention (alias) associated with it, which represents a group of co-referring actor mentions. At L1 level, a predicted message is counted as a true positive if the combination of the predicted sender mention, receiver mention and message label (i.e., the complete message) is present in the gold standard messages for the same sentence. False positives and false negatives are computed on similar lines and overall F-measures are computed for identifying complete messages, at actor mention level. Similarly, the corresponding F-measures at L2 (canonical mention) level are also computed by considering canonical senders/receivers instead of their mentions.

Experiments were conducted at two different settings: i) Setting S1: using gold-standard information about actor mentions, canonical mentions and interaction verbs ii) Setting S2: using predicted actors and interaction verbs. For predicting actor mentions and identifying canonical mentions, the systems and methods of the present disclosure utilized a technique discussed in India patent application 201721013935 filed on Apr. 19, 2017; and a technique for predicting interaction verbs. For evaluating the ILP based temporal ordering approach as implemented by the systems and methods of the present disclosure, Kendall's rank correlation coefficient technique as known in the art was utilized to compare predicted and gold time-lines of a key actor in each dataset (e.g., Mao Zedong in the Mao dataset).

Baselines (B-Kof) and OpenIE (BOIE) were utilized since the objective were similar as compared with the embodiments of the present disclosure. To avoid unnecessarily penalizing B-OIE, only those extractions were considered where relations fit the definition of interaction verbs and arguments fit the definition of actors as described by the present disclosure. The present disclosure's temporal ordering approach with default text-order based baseline have been compared. Below Table 2 shows the comparative performance of the proposed approaches for message extraction and temporal ordering.

TABLE 2

| Dataset | Approach | Message Label | | Complete Message | | | | Temporal ordering | | | |
|---|---|---|---|---|---|---|---|---|---|---|---|
| | | | | Actor Mentions | | Canonical Mentions | | Text-Order | | ILP | |
| | | S1 | S2 | S1 | S2 | S1 | S2 | S1 | S2 | S1 | S2 |
| Nap | B-OIE | 0.54 | 0.42 | 0.38 | 0.18 | 0.38 | 0.18 | — | — | — | — |
| | B-Kof | 0.32 | 0.25 | 0.17 | 0.08 | 0.17 | 0.08 | — | — | — | — |
| | B1 | 0.92 | 0.67 | 0.49 | 0.28 | 0.49 | 0.32 | — | — | — | — |
| | B2 | 0.94 | 0.70 | 0.64 | 0.32 | 0.62 | 0.34 | — | — | — | — |
| | M1 | 0.95 | 0.68 | 0.51 | 0.26 | 0.51 | 0.31 | 0.99 | 0.99 | 1.0 | 1.0 |
| | M2 | 0.94 | 0.71 | 0.65 | 0.29 | 0.64 | 0.29 | 0.99 | 0.99 | 1.0 | 0.97 |
| | M3 | 0.94 | 0.71 | 0.66 | 0.32 | 0.64 | 0.33 | 0.99 | 0.99 | 1.0 | 1.0 |
| Fas | B-OIE | 0.56 | 0.51 | 0.44 | 0.28 | 0.43 | 0.19 | — | — | — | — |
| | B-Kof | 0.41 | 0.29 | 0.22 | 0.12 | 0.22 | 0.07 | — | — | — | — |
| | B1 | 0.93 | 0.63 | 0.58 | 0.31 | 0.58 | 0.25 | — | — | — | — |
| | B2 | 0.92 | 0.62 | 0.59 | 0.29 | 0.59 | 0.22 | — | — | — | — |
| | M1 | 0.94 | 0.60 | 0.59 | 0.29 | 0.59 | 0.23 | 0.99 | 1.0 | 0.98 | 1.0 |
| | M2 | 0.92 | 0.63 | 0.64 | 0.28 | 0.64 | 0.22 | 0.99 | 0.99 | 0.98 | 1.0 |
| | M3 | 0.92 | 0.63 | 0.69 | 0.33 | 0.69 | 0.26 | 0.97 | 0.99 | 0.98 | 1.0 |
| Mao | B-OIE | 0.48 | 0.50 | 0.34 | 0.24 | 0.35 | 0.19 | — | — | — | — |
| | B-Kof | 0.28 | 0.29 | 0.12 | 0.07 | 0.12 | 0.07 | — | — | — | — |
| | B1 | 0.86 | 0.72 | 0.40 | 0.31 | 0.41 | 0.21 | — | — | — | — |
| | B2 | 0.93 | 0.74 | 0.61 | 0.31 | 0.63 | 0.18 | — | — | — | — |
| | M1 | 0.93 | 0.76 | 0.44 | 0.31 | 0.45 | 0.22 | 0.88 | 0.88 | 0.85 | 0.85 |
| | M2 | 0.93 | 0.73 | 0.65 | 0.34 | 0.67 | 0.20 | 0.90 | 0.88 | 0.88 | 0.86 |
| | M3 | 0.93 | 0.73 | 0.65 | 0.33 | 0.66 | 0.21 | 0.90 | 0.88 | 0.88 | 0.86 |
| BoH | B-OIE | 0.39 | 0.40 | 0.28 | 0.19 | 0.28 | 0.04 | — | — | — | — |
| | B-Kof | 0.25 | 0.22 | 0.09 | 0.06 | 0.09 | 0.02 | — | — | — | — |
| | B1 | 0.91 | 0.79 | 0.58 | 0.50 | 0.51 | 0.21 | — | — | — | — |
| | B2 | 0.96 | 0.80 | 0.63 | 0.43 | 0.59 | 0.21 | — | — | — | — |
| | M1 | 0.96 | 0.81 | 0.64 | 0.47 | 0.56 | 0.22 | 0.96 | 0.96 | 0.97 | 0.94 |
| | M2 | 0.96 | 0.79 | 0.65 | 0.46 | 0.61 | 0.21 | 0.96 | 0.96 | 0.96 | 0.96 |
| | M3 | 0.96 | 0.79 | 0.71 | 0.52 | 0.65 | 0.22 | 0.96 | 0.96 | 0.96 | 0.96 |
| bAbI | B-OIE | 1.00 | 1.00 | 1.00 | 0.81 | 1.00 | 0.81 | — | — | — | — |
| | B-Kof | 0.83 | 0.67 | 0.83 | 0.67 | 0.83 | 0.67 | — | — | — | — |
| | B1 | 1.00 | 1.00 | 0.95 | 0.77 | 0.95 | 0.77 | — | — | — | — |
| | B2 | 1.00 | 1.00 | 0.46 | 0.39 | 0.46 | 0.39 | — | — | — | — |
| | M1 | 1.00 | 1.00 | 1.00 | 0.81 | 1.00 | 0.81 | 0.73 | 0.73 | 1.0 | 1.0 |
| | M2 | 1.00 | 1.00 | 1.00 | 0.81 | 1.00 | 0.81 | 0.73 | 0.73 | 1.0 | 1.0 |
| | M3 | 1.00 | 1.00 | 1.00 | 0.81 | 1.00 | 0.81 | 0.73 | 0.73 | 1.0 | 1.0 |

Analysis of Results:

It can be observed in Table 2 that the present disclosure's approaches M1 and M2 are consistently outperforming their corresponding baselines for all datasets in Setting S1. Also, the approach M3 outperforms all other approaches in Setting S1.

F1—measures in the setting S2 get reduced considerably as compared to S1. Present disclosure's approach is a pipeline-based approach where output of actor identification and interaction verb identification are provided as input for the message creation algorithms (pseudo codes). Hence, the errors in these earlier stages are propagated to the message creation stage, resulting in low performance for overall message identification. Especially, identifying coreferences of actor mentions to determine canonical mentions, is a hard problem in itself as known in the art. Hence, in the setting S2, a significant drop in F1-measure is observed during navigation from L1 level messages to the L2 level where identification of correct canonical sender/receiver is important.

History narratives tend to describe interactions mostly in the order in which they happen. Text order of interactions in the History narratives conforms with the actual temporal order of interactions, to a large extent. Hence, performance of present disclosure's approach and Text-Order baseline is almost similar for History dataset. However, for datasets like bAbI in which text order of interactions differs significantly from the actual temporal order, the performance of present disclosure's temporal ordering approach is better than the baseline.

Message Sequence Charts (MSC) is an important knowledge representation to summarize and visualize narratives such as historical texts. Embodiments of the present disclosure implement systems and methods to automatically extract MSC from history narratives. It is observed from implementation that combining dependency parsing, semantic role labelling and linguistic knowledge achieves the best performance on different narratives.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g.

an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
   obtaining, via one or more hardware processors, textual description indicative of a narrative text comprising a plurality of sentences;
   identifying a plurality of actors and aliases in the textual description and resolving corresponding coreferences associated thereof, via the one or more hardware processors;
   traversing, via the one or more hardware processors, using a breadth-first-search (BFS) technique, dependency parse tree of each sentence from the textual description to obtain past-tense words and a set of identified verbs in the obtained past-tense words;
   identifying, via the one or more hardware processors, at least a subset of interaction verbs from the set of identified verbs as at least one of a first type verb or a second type verb to obtain a set of interactions;
   identifying, via the one or more hardware processors, predicates and corresponding arguments in at least a subset of the plurality of sentences based on the set of interactions;
   identifying, via the one or more hardware processors, using the identified predicates and corresponding arguments, senders and receivers from the plurality of actors and aliases, for each valid interaction from the set of interactions, wherein the senders and receivers are identified for the valid interactions comprised in at least a subset of sentences from the plurality of sentences;
   filtering, via the one or more hardware processors, the senders and receivers, using dependency parse based rules, to obtain a filtered set of senders and receivers;
   generating, via the one or more hardware processors, using the filtered set of senders and receivers, (i) a message for each unique combination of sender and receiver for each interaction verb from the subset to obtain a set of messages, and (ii) a message label for each of the set of messages, wherein the message label is indicative of a scenario; and
   generating, via the one or more hardware processors, a temporal ordering of messages using the set of messages based on an availability of explicit and relative time expressions in each sentence of the set of messages, wherein the temporal ordering of messages forms a message sequence chart.

2. The processor implemented method of claim 1, wherein the step of identifying at least a subset of interaction verbs as at least one of a first type verb or a second type verb to obtain a set of interactions comprises eliminating one or more verbs of the set of identified verbs based on one or more criteria.

3. The processor implemented method of claim 2, wherein the one or more criteria comprise verbs representing mental actions, copula verbs, and verbs denoting states of objects and actors.

4. The processor implemented method of claim 1, wherein an interaction verb in the obtained past-tense words is one of an action verb or a communication verb.

5. The processor implemented method of claim 1, wherein the senders and receivers are identified by applying a Semantic Role Labelling (SRL) and semantic and syntactic verbal lexical resource based techniques on the identified predicates and corresponding arguments.

6. The processor implemented method of claim 1, wherein the senders are initiators of an interaction.

7. The processor implemented method of claim 1, wherein the receivers are other actors involved in the interaction with corresponding senders.

8. A system, comprising:
a memory storing instructions;
one or more communication interfaces; and
one or more hardware processors coupled to the memory via the one or more communication interfaces, wherein the one or more hardware processors are configured by the instructions to:
obtain textual description indicative of a narrative text comprising a plurality of sentences;
identify a plurality of actors and aliases in the textual description and resolve corresponding coreferences associated thereof;
traverse, using a breadth-first-search (BFS) technique, dependency parse tree of each sentence from the textual description to obtain past-tense words and a set of identified verbs in the obtained past-tense words;
identify at least a subset of interaction verbs from the set of identified verbs as at least one of a first type verb or a second type verb to obtain a set of interactions;
identify predicates and corresponding arguments in at least a subset of the plurality of sentences based on the set of interactions;
identify, using the identified predicates and corresponding arguments, senders and receivers from the plurality of actors and aliases, for each valid interaction from the set of interactions, wherein the senders and receivers are identified for the valid interactions comprised in at least a subset of sentences from the plurality of sentences;
filter the senders and receivers, using dependency parse based rules, to obtain a filtered set of senders and receivers;
generate, using the filtered set of senders and receivers, (i) a message for each unique combination of sender and receiver for each interaction verb from the subset to obtain a set of messages, and (ii) a message label for each of the set of messages, wherein the message label is indicative of a scenario; and
generate a temporal ordering of messages using the set of messages based on an availability of explicit and relative time expressions in each sentence of the set of messages, wherein the temporal ordering of messages forms a message sequence chart.

9. The system of claim 8, wherein the at least a subset of interaction verbs is identified as at least one of a first type verb or a second type verb to obtain a set of interactions by eliminating one or more verbs of the set of identified verbs based on one or more criteria.

10. The system of claim 9, wherein the one or more criteria comprise verbs representing mental actions, copula verbs and verbs denoting states of objects and actors.

11. The system of claim 8, wherein an interaction verb in the obtained past-tense words is one of an action verb or a communication verb.

12. The system of claim 8, wherein the senders and receivers are identified by applying a Semantic Role Labelling (SRL) and semantic and syntactic verbal lexical resource based techniques on the identified predicates and corresponding arguments.

13. The system of claim 8, wherein the senders are initiator of an interaction.

14. The system of claim 8, wherein the receivers are other actors involved in an interaction with corresponding senders.

15. One or more non-transitory machine readable information storage mediums comprising one or more instructions which when executed by one or more hardware processors cause automated extraction of message sequence chart from textual description by:
obtaining textual description indicative of a narrative text comprising a plurality of sentences;
identifying a plurality of actors and aliases in the textual description and resolving corresponding coreferences associated thereof;
traversing, using a breadth-first-search (BFS) technique, dependency parse tree of each sentence from the textual description to obtain past-tense words and a set of identified verbs in the obtained past-tense words;
identifying at least a subset of interaction verbs from the set of identified verbs as at least one of a first type verb or a second type verb to obtain a set of interactions;
identifying predicates and corresponding arguments in at least a subset of the plurality of sentences based on the set of interactions;
identifying, using the identified predicates and corresponding arguments, senders and receivers from the plurality of actors and aliases, for each valid interaction from the set of interactions, wherein the senders and receivers are identified for the valid interactions comprised in at least a subset of sentences from the plurality of sentences;
filtering the senders and receivers, using dependency parse based rules, to obtain a filtered set of senders and receivers;
generating, using the filtered set of senders and receivers, (i) a message for each unique combination of sender and receiver for each interaction verb from the subset to obtain a set of messages, and (ii) a message label for each of the set of messages, wherein the message label is indicative of a scenario; and
generating a temporal ordering of messages using the set of messages based on an availability of explicit and relative time expressions in each sentence of the set of messages, wherein the temporal ordering of messages forms a message sequence chart.

16. The one or more non-transitory machine readable information storage mediums of claim 15, wherein the step of identifying at least a subset of interaction verbs as at least one of a first type verb or a second type verb to obtain a set of interactions comprises eliminating one or more verbs of the set of identified verbs based on one or more criteria.

17. The one or more non-transitory machine readable information storage mediums of claim 16, wherein the one or more criteria comprise verbs representing mental actions, copula verbs, and verbs denoting states of objects and actors.

18. The one or more non-transitory machine readable information storage mediums of claim 15, wherein an interaction verb in the obtained past-tense words is one of an action verb or a communication verb.

19. The one or more non-transitory machine readable information storage mediums of claim 15, wherein the senders and receivers are identified by applying a Semantic Role Labelling (SRL) and semantic and syntactic verbal lexical resource based techniques on the identified predicates and corresponding arguments.

20. The one or more non-transitory machine readable information storage mediums of claim 15, wherein the senders are initiators of an interaction, and wherein the receivers are other actors involved in the interaction with corresponding senders.

* * * * *